United States Patent [19]

Ogishima et al.

[11] Patent Number: 5,757,454
[45] Date of Patent: May 26, 1998

[54] LIQUID CRYSTAL DISPLAY DEVICE WITH HOMEOTROPIC ALIGNMENT IN WHICH TWO LIQUID CRYSTAL REGIONS ON THE SAME SUBTRATE HAVE DIFFERENT PRETILT DIRECTIONS BECAUSE OF RUBBING

[75] Inventors: Kiyoshi Ogishima, Nara; Shinji Shimada, Kashihara, both of Japan

[73] Assignee: Sharp, Kabushiki Kaisha, Osaka, Japan

[21] Appl. No.: 705,860

[22] Filed: Aug. 28, 1996

[30] Foreign Application Priority Data

Aug. 28, 1995 [JP] Japan ................. 7-219159

[51] Int. Cl.$^6$ ............ G02F 1/1337; G02F 1/141
[52] U.S. Cl. ............ 349/129; 349/130; 349/136
[58] Field of Search ............ 349/129, 123, 349/130, 131, 136

[56] References Cited

U.S. PATENT DOCUMENTS

| | | | |
|---|---|---|---|
| 4,333,708 | 6/1982 | Boyd et al. | 349/129 |
| 5,136,407 | 8/1992 | Clerc | 349/130 |
| 5,305,126 | 4/1994 | Kobayashi et al. | 349/86 |
| 5,309,264 | 5/1994 | Lien et al. | 349/130 |
| 5,473,455 | 12/1995 | Koike et al. | 349/132 |
| 5,477,358 | 12/1995 | Rosenblatt et al. | 349/130 |

OTHER PUBLICATIONS

K. Tsuda et al. Japanese Laid–Open Patent Publication No. 5–188374, Jul. 30, 1993.
K. Takatori et al. Japanese Laid–Open Patent Publication No. 5–107544, Apr. 30, 1993.

*Primary Examiner*—William L. Sikes
*Assistant Examiner*—Walter Malinowski
*Attorney, Agent, or Firm*—David G. Conlin; William J. Daley, Jr.

[57] ABSTRACT

A liquid crystal display device of the present invention, includes: a liquid crystal layer, an electrode applying a voltage to the liquid crystal layer, a pair of alignment layers in contact with the liquid crystal layer and a pair of substrates sandwiching the liquid crystal layer, each of the pair of substrates including the electrode and the alignment layer. The liquid crystal layer having a liquid crystal material with negative dielectric anisotropy and at least first and second regions, the pair of alignment layers aligns liquid crystal molecules substantially vertical to planes of the pair of substrates when no voltage is applied to the liquid crystal layer, and the liquid crystal molecules at least in each of first and second regions tilt in different directions when a voltage is applied to the liquid crystal layer.

9 Claims, 3 Drawing Sheets

LIQUID CRYSTAL DISPLAY DEVICE WITH HOMEOTROPIC ALIGNMENT IN WHICH TWO LIQUID CRYSTAL REGIONS ON THE SAME SUBTRATE HAVE DIFFERENT PRETILT DIRECTIONS BECAUSE OF RUBBING

BACKGROUND OF THE INVENTION

1. Field of the Invention

The present invention relates to a liquid crystal display device used for computer screens or the like, and more particularly relates to a liquid crystal device having high contrast.

2. Description of the Related Art

As a liquid crystal display device, a TN (twisted nematic) liquid crystal display device is known. The TN liquid crystal display device includes a pair of transparent substrates, a transparent electrode formed on each of the substrates, and alignment films subjected to an alignment treatment formed on both of the substrates. Nematic liquid crystal material with positive dielectric anisotropy having a twisting property is interposed between the pair of transparent substrates to twist a liquid crystal molecular orientation by an angle of 90°, whereby a polarization plane of propagating light is rotated by an angle of 90°.

When a voltage is applied to a liquid crystal layer of such a TN liquid crystal display device, the major axes of liquid crystal molecules shift in a direction of an electric field, whereby the optical rotatory power of the propagating light is weakened. By sandwiching the pair of substrates having a liquid crystal layer interposed therebetween with two polarizers, an image can be displayed based on the variations in light transmittance. When the two polarizers are disposed in a parallel Nicols state, an image is displayed in a normally black mode in which a black display is obtained with no voltage applied. On the other hand, when the two polarizers are disposed in a crossed Nicols state, an image is displayed in a normally white mode in which a white display is obtained with no voltage applied.

Generally, in the above-mentioned TN liquid crystal display device, a polymer film (which is to be an alignment film) is formed on each substrate and is subjected to, for example, a rubbing treatment, whereby a pretilt angle is formed between the major axes of the liquid crystal molecules and the surface of the substrate. The purpose of this is to prevent a plurality of liquid crystal domains from being formed by the disturbance of the orientation direction of the liquid crystal molecules under the application of a voltage. As is well known, the pretilt angle thus formed is controlled so as to relax a viewing angle dependence. More specifically, more than one liquid crystal region each having a different orientation are formed, for example, in every minute area, i.e., in every picture element (hereinafter, referred to simply as a "pixel") by controlling the pretilt angle.

When providing more than one liquid crystal region, a high pretilt angle region and a low pretilt angle region are provided on each of the pair of substrates, and the two substrates are attached to each other in such a manner that the high pretilt angle region and the low pretilt angle region on each substrate face each other. When a voltage is applied to such a liquid crystal display device, the liquid crystal molecules in the low pretilt angle region on one substrate align in accordance with the rise of the liquid crystal molecules in the high pretilt angle region on the other substrate. Consequently, the liquid crystal molecules in the high pretilt angle region and the adjacent low pretilt angle region rise in opposite directions from each other. Moreover, even when adjacent regions having pretilt angles in opposite directions are provided on each of the two substrates, liquid crystal molecules in one of the regions rise in opposite directions with respect to those in the adjacent region.

The following two methods are known for providing more than one different pretilt angle region on a single substrate. According to one method, more than one kind of polymer film, each of which will have a different pretilt angle by an alignment treatment, are patterned on the substrates and subsequently subjected to rubbing to form an alignment film (Japanese Laid-Open Patent Publication No. 5-188374). According to the other method, a resist is formed on a polymer film which has been subjected to an alignment treatment, then the polymer film is subjected to another alignment treatment under a different condition, and the resist is removed, whereby an alignment film is formed (Japanese Laid-Open Patent Publication No. 5-107544).

In the conventional examples as described above, the liquid crystal display device with no viewing angle dependence is realized using liquid crystal material with positive dielectric anisotropy. Such liquid crystal material contains liquid crystal molecules which are generally parallel to the substrate under no application of a voltage and rise with respect to the substrate under the application of a voltage. In the case where such a liquid crystal device is driven in a normally white mode, in which the two polarizers are disposed in a crossed Nicols state, a black level needs to be increased by applying a higher voltage to the liquid crystal layer in order to obtain high contrast. However, a phase difference of light that passes through the liquid crystal layer cannot be completely eliminated even when a voltage is applied, since the liquid crystal molecules in the vicinity of the surfaces of the substrates scarcely move. Therefore, it is impossible to obtain zero transmittance for all wavelengths, causing the decrease in contrast, which has been one of the problems of the liquid crystal display device as well as the increase in a driving voltage.

SUMMARY OF THE INVENTION

The liquid crystal display device of the present invention includes: a liquid crystal layer, an electrode applying a voltage to the liquid crystal layer, a pair of alignment layers in contact with the liquid crystal layer, and a pair of substrates sandwiching the liquid crystal layer, each of the pair of substrates having the electrode and the alignment layer. The liquid crystal layer includes a liquid crystal material with negative dielectric anisotropy and at least first and second regions. The pair of alignment layers align liquid crystal molecules generally perpendicular to planes of the pair of substrates when no voltage is applied to the liquid crystal layer. The liquid crystal molecules at least in each of the first and second regions fall in different directions when a voltage is applied to the liquid crystal layer.

In one embodiment of the invention, the liquid crystal display device includes a plurality of pixel regions disposed in a matrix, each of the plurality of pixel regions including at least the first and the second regions.

Alternatively, the liquid crystal display device of the present invention includes a plurality of pixel regions disposed in a matrix, where more than one pixel region of the plurality of pixel regions include at least the first and the second regions.

In accordance with a further aspect of the present invention, the alignment layer is formed of a polymer material having side chains.

In another embodiment of the present invention, the liquid crystal layer further comprises a chiral dopant.

In still another embodiment of the present invention, the liquid crystal molecules of the liquid crystal layer have a pretilt angle of 3° or less with respect to a normal to each of planes of the pair of substrates.

In still another embodiment of the present invention, the first and second regions are generally of the same size and tilt directions of the liquid crystal molecules at each of the first and second regions are shifted from each other by 180°.

In still another embodiment of the present invention, the liquid crystal display device further includes a pair of polarizing plates, each of the pair of polarizing plates being provided on each of the pair of substrates, respectively, and polarizing axes of the pair of polarizing plates being orthogonal to each other.

In still another embodiment of the present invention, each of the pair of alignment layers are subjected to an alignment treatment in directions shifted by 90° from each other.

According to the present invention, a homeotropic alignment layer and liquid crystal material with negative dielectric anisotropy are used. When no voltage is applied to a liquid crystal layer, liquid crystal molecules 16 uniformly align in a direction perpendicular to surfaces of substrates 1 and 4 as shown in FIG. 1A. When a voltage is applied to the liquid crystal layer, different viewing angle characteristics are obtained simultaneously since the liquid crystal molecules 16 tilt in more than one different direction in a minute unit region, for example, in one or more pixels as shown in FIG. 1B.

A high black level can be obtained by sandwiching the pair of substrates having the above-described structure with two polarizing plates disposed in a crossed Nicols state. A high driving voltage is not necessary to increase the black level and thus, a high contrast display can be obtained with a low voltage.

Furthermore, the changes in transmittance can be increased to enhance a contrast by setting a pretilt angle of the above-mentioned liquid crystal layer to 3° or less, preferably 1° or less with respect to the normal of the aforementioned substrates.

For example, two regions of generally identical areas are formed in a minute unit region in such a manner that pretilt directions of the liquid crystal molecules in the two regions are set to be shifted by approximately 180° from each other. When a voltage is applied to the liquid crystal layer, the liquid crystal molecules twist by 90° between the substrates while tilting in directions shifted by 180° in each of the two regions, whereby viewing angle characteristics in both up and down directions can be obtained at the same time.

Thus, the invention described herein makes possible the advantage of providing a liquid crystal display device with improved viewing angle characteristics, enabling an image to be displayed in high contrast with a lower voltage.

This and other advantages of the present invention will become apparent to those skilled in the art upon reading and understanding the following detailed description with reference to the accompanying figures.

DESCRIPTION OF THE PREFERRED EMBODIMENTS

Hereinafter, the present invention will be described by way of an illustrative example with reference to the accompanying drawings.

In the following example, pretilt angles are defined with respect to the normal of the substrates.

Figure 2:
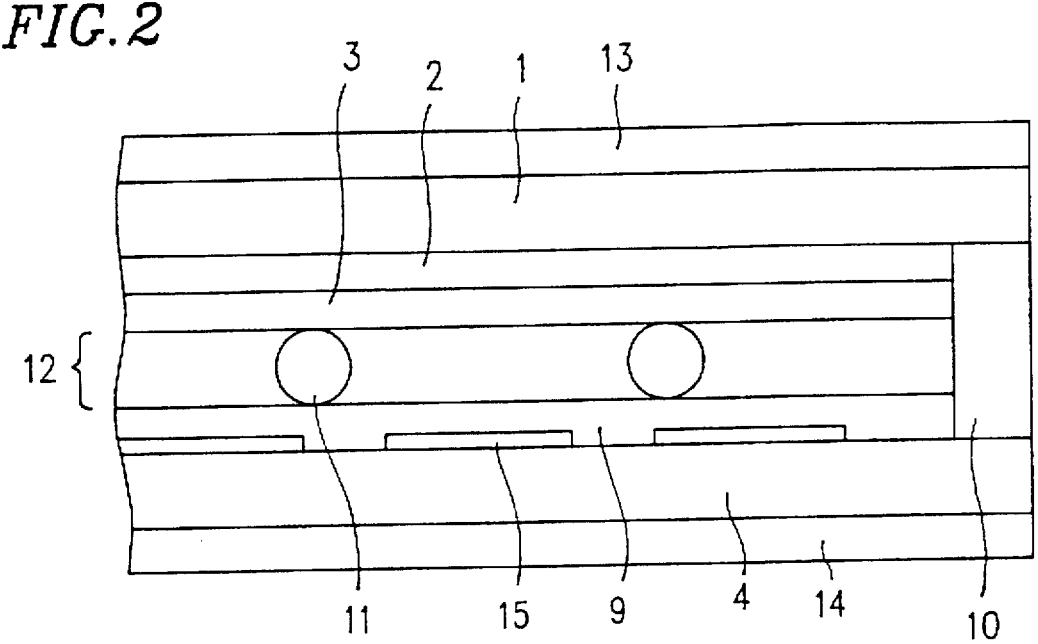
FIG. 2 is a cross-sectional view of an exemplary liquid crystal display device according to the present invention.
Figure 3:
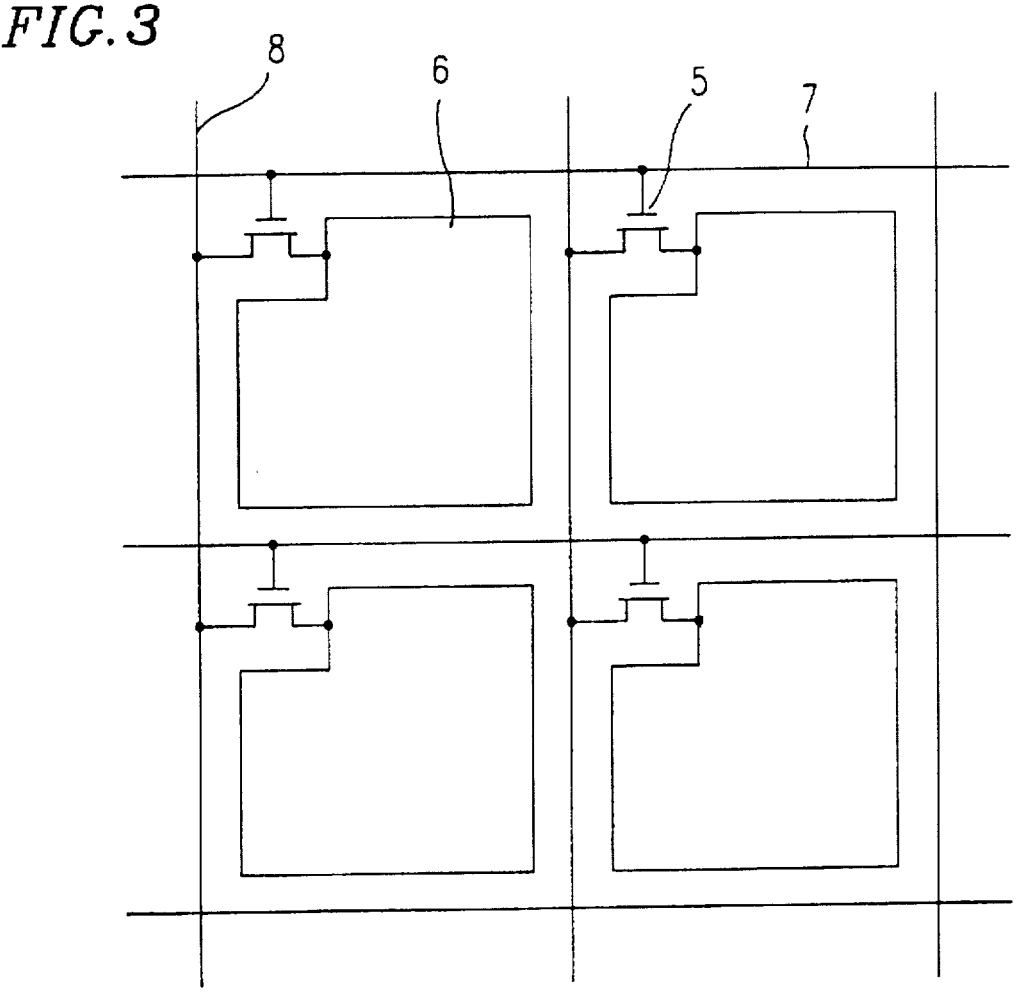
FIG. 3 is a plan view of an active matrix substrate of the liquid crystal display device shown in FIG. 2.

FIG. 2 is a cross-sectional view showing an example of a liquid crystal display device according to the present invention. A transparent electrode 2 and a homeotropic alignment film 3 are formed on a surface of a transparent substrate 1. On a surface of an opposing transparent substrate 4 (FIG. 2), TFTs (thin film transistors) 5 and transparent pixel electrodes 6 are disposed in a matrix, and gate bus lines 7 and source bus lines 8 are arranged so as to cross each other at right angles as shown in FIG. 3. TFTs 5 and transparent pixel electrode 6 in FIG. 3 are collectively referred to by reference number 15 in FIG. 2. Returning to FIG. 2, the transparent substrate 4 with such a structure is covered with a homeotropic alignment film 9. The two substrates 1 and 4 are attached to each other with a sealing resin 10 sealing a periphery of the substrates. In the gap between the two substrates, nematic liquid crystal material with a negative dielectric anisotropy is interposed with a thickness of the gap being kept constant by spacers 11, thereby defining a liquid crystal layer 12. On outer surfaces of the substrates 1 and 4, i.e., the reverse side of the surfaces in contact with the liquid crystal layer 12, polarizing plates 13 and 14 are respectively disposed in a crossed Nicols state.

Figure 1A:
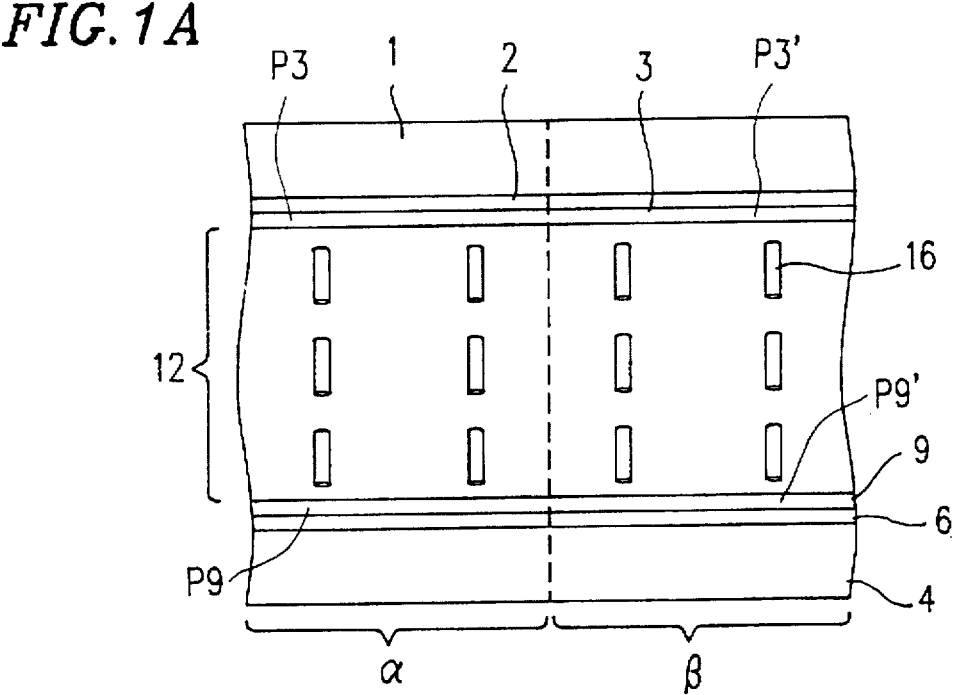
FIG. 1A is a cross-sectional view showing an orientation of liquid crystal molecules with no voltage applied in a liquid crystal display device according to the present invention.

As illustrated in FIG. 1A, the alignment film 3 includes areas P3 and P3' and the alignment film 9 includes areas P9 and P9'. Areas P3 and P9 face each other and areas P3' and P9' face each other. A region of the liquid crystal layer 12 between the areas P3 and P9 is defined as α and a region of the liquid crystal layer 12 between the areas P3' and P9' is defined as β.

The areas P3 and P3' of the alignment film 3 provide different pretilt directions shifted by 180° from each other. Similarly, each of the areas P9 and P9' of the alignment film 9 provides different pretilt direction shifted by 180° from each other. The opposing areas P3 and P9 and also the opposing areas P3' and P9' provide different pretilt directions shifted by 90° from each other. The pretilt angles given by the areas P3, P3', P9 and P9' are approximately 3° or less, and preferably 1° or less.

When no voltage is applied to the liquid crystal layer 12, the liquid crystal molecules align generally perpendicular to the surfaces of the substrates 1 and 4. However, the liquid crystal molecules in direct contact with the alignment films 3 and 9 align with the abovementioned pretilt angle.

When a voltage is applied to the liquid crystal layer 12, the liquid crystal molecules fall in directions perpendicular to the electric field. The liquid crystal molecules in the regions α and β fall in different directions shifted by 180° from each other in accordance with the pretilt directions of the liquid crystal molecules in contact with the alignment film 3 and 9. Finally, the orientation directions of the liquid crystal layer in the regions α and β twist by 90° between the substrates 1 and 4. In this example, the two regions α and β include one transparent pixel electrode 6. Accordingly, the two regions α and β practically coincide with one pixel.

Such a liquid crystal display device is produced, for example, in the following manner.

Referring to FIGS. 1A, 2 and 3, first, homeotropic alignment films 3 and 9 are formed on transparent substrates 1 and 4, respectively, the transparent substrate 1 having a transparent electrode 2 and the transparent substrate 4 having TFTs 5 or the like. As these homeotropic alignment films 3 and 9, for example, a polymer material having side chains can be used. In this example, a homeotropic alignment film JALS-203 (produced by Japan Synthetic Rubber Co., Ltd.) is applied to the transparent substrates so as to have a thickness of 500 Å by printing, and is then sintered at 180° C. for 90 minutes in an oven.

Two regions α and β are formed in each pixel by patterning a resist on each of the alignment films 3 and 9 which have been subjected to an alignment treatment in a first direction, followed by another alignment treatment under a different condition in a second direction. More specifically, first, a resist film is patterned on the alignment film which has been subjected to the first alignment treatment (i.e., rubbing) in the first direction. In this example, a predetermined resist pattern is formed by applying OFPR-800 (produced by Tokyo Ohka Kogyo Co., Ltd.), which is a positive resist, over the entire surface of the alignment film using spin coating to have a thickness of 1 μm, followed by exposure and development. Then, the second alignment treatment is conducted by rubbing the surface of the alignment film in a direction shifted by 180° from the rubbing direction of the first alignment. After the second alignment treatment, the alignment film is washed in such a manner that the resist is peeled off from the alignment film. The minute unit region, in which the two adjacent regions α and β are formed, may correspond to more than one pixel and does not necessarily correspond to one pixel. It is, however, more preferable to provide the two regions α and β in every single pixel so that the viewing angle characteristics of every pixel can be improved.

Figure 4:
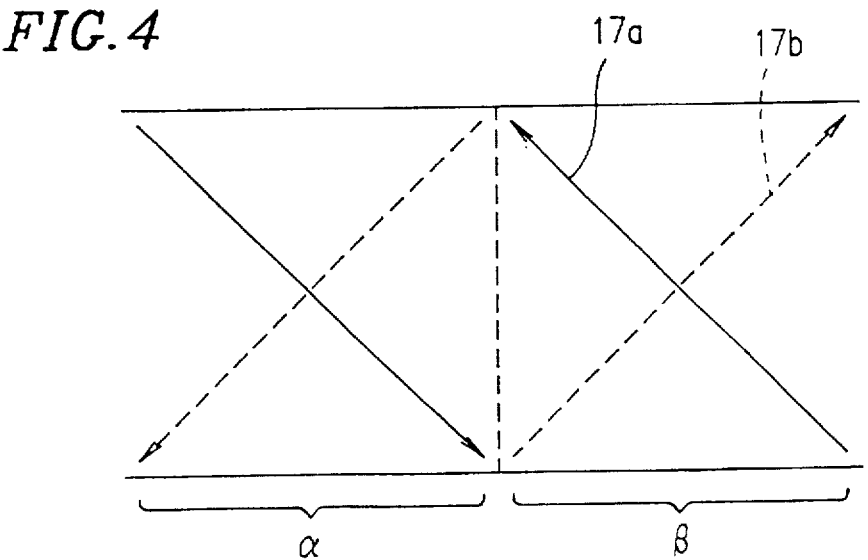
FIG. 4 is a plan view showing a rubbing direction of an alignment film of the liquid crystal display device shown in FIG. 2.

Next, in order to keep a constant thickness between the two substrates (i.e., to maintain a constant thickness of the cell), spacers are dispersed on the substrates before the two substrates are attached to each other with a sealing resin that is a thermosetting adhesive. The two substrates are attached to each other in such a manner that the regions having alignment directions shifted by 180° face each other as shown in FIG. 4. FIG. 4 shows a liquid crystal cell viewed from above, in which a solid line 17a shows the alignment direction of the upper substrate and a broken line 17b shows the alignment direction of the lower substrate.

Thereafter, the liquid crystal material is injected between the substrates through an opening by vacuum injection. In this example, ZLI-4788-000 (produced by Merck & Co., Inc.) doped with a predetermined amount (e.g., approximately 0.3 wt %) of chiral material which controls the twisting direction of the liquid crystal molecules is injected. The opening is then sealed with a sealing agent. Then, a realignment is performed in an oven at a temperature of 110° C. for an hour.

Figure 1B:
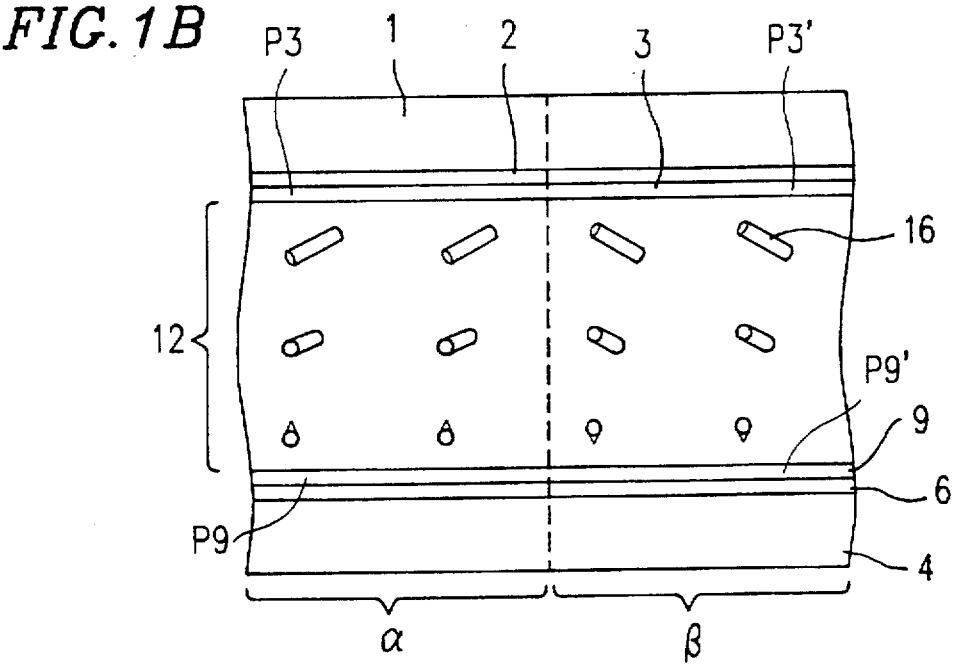
FIG. 1B is a cross-sectional view showing an orientation of the liquid crystal molecules with a voltage applied in the liquid crystal display device according to the present invention.

In this liquid crystal display device, the liquid crystal molecules 16 uniformly align in a direction perpendicular to the substrates 1 and 4 as shown in FIG. 1A when no voltage is applied to the liquid crystal layer 12. Therefore, by disposing two polarizing plates on the outer surfaces of the transparent substrates in a crossed Nicols state, a high black level making use of the polarizing plate characteristics is obtained. In this example, the orientation of the liquid crystal molecules 16 is not required to be precisely perpendicular to the substrates when no voltage is applied to the liquid crystal layer 12, as long as the pretilt angle is 3° or less, preferably 1° or less with respect to the normal of the substrate. Furthermore, when a voltage is applied to the liquid crystal layer 12, the liquid crystal molecules 16 in the two regions α and β fall in different directions. The liquid crystal molecules 16 in the regions α and β twist by 90° while falling in directions shifted by 180° from each other as shown in FIG. 1B. As a result, viewing angle characteristics in up and down directions are improved simultaneously.

Moreover, if necessary, by repeating the above-described steps of patterning the resist and performing the alignment treatments, even more regions such as four regions, the pretilt directions of which shift by 90°, can be formed in a minute unit region.

As is evident from the above description, according to the present invention, various viewing angles, for example, in both directions perpendicular to the substrates can be made generally symmetrical, to obtain excellent viewing angle characteristics. Moreover, by sandwiching the pair of substrates having such a structure with the two polarizing plates disposed in a crossed Nicols state, a high black level making use of the polarizing plate characteristics can be obtained. Accordingly, a high contrast display can be obtained with a lower voltage.

Various other modifications will be apparent to and can be readily made by those skilled in the art without departing from the scope and spirit of this invention. Accordingly, it is not intended that the scope of the claims appended hereto be limited to the description as set forth herein, but rather that the claims be broadly construed.

What is claimed is:

1. A liquid crystal display device, comprising:

a liquid crystal layer;

an electrode applying a voltage to the liquid crystal layer;

a pair of alignment layers in contact with the liquid crystal layer; and a pair of substrates sandwiching the liquid crystal layer, each of the pair of substrates having the electrode and the alignment layer, wherein the liquid crystal layer includes a liquid crystal material with negative dielectric anisotropy and at least first and second regions, the pair of alignment layers align liquid crystal molecules generally perpendicular to planes of the pair of substrates when no voltage is applied to the liquid crystal layer, the liquid crystal molecules, at least in the first and second regions, have different pretilt directions provided by a rubbing treatment, and the liquid crystal molecules at least in each of the first and second regions fall in different directions when a voltage is applied to the liquid crystal layer.

2. A liquid crystal display device according to claim 1, comprising a plurality of pixel regions disposed in a matrix, wherein each of the plurality of pixel regions includes at least the first and the second regions.

3. A liquid crystal display device according to claim 1, comprising a plurality of pixel regions disposed in a matrix, wherein more than one pixel regions of the plurality of pixel regions include at least the first and the second regions.

4. A liquid crystal display device according to claim 1, wherein the alignment layer is formed of a polymer material having side chains.

5. A liquid crystal display device according to claim 1, wherein the liquid crystal layer further comprises a chiral dopant.

6. A liquid crystal display device according to claim 1, wherein the liquid crystal molecules of the liquid crystal layer has a pretilt angle of 3° or less with respect to a normal to each of planes of the pair of substrates.

7. A liquid crystal display device according to claim 1, wherein the first and the second regions are generally of the same size and tilt directions of the liquid crystal molecules at each of the first and the second regions are shifted from each other by 180°.

8. A liquid crystal display device according to claim 1, further comprising a pair of polarizing plates, wherein each of the pair of polarizing plates is provided on each of the pair of substrates, respectively, and polarizing axes of the pair of polarizing plates are orthogonal to each other.

9. A liquid crystal display device according to claim 1, wherein each of the pair of alignment layers provides pretilt direction shifted by 90° from each other.

* * * * *